(12) United States Patent
Tao (10) Patent No.: US 12,184,210 B1
(45) Date of Patent: Dec. 31, 2024

(54) FAN AND LAMP CONTROL CIRCUIT, FAN AND LAMP DEVICE, AND FAN AND LAMP SYSTEM

(71) Applicant: SHENZHEN FUNPOWER GENERAL TECHNOLOGY CO., LTD., Shenzhen (CN)

(72) Inventor: Biaowei Tao, Shenzhen (CN)

(73) Assignee: SHENZHEN FUNPOWER GENERAL TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/613,722

(22) Filed: Mar. 22, 2024

(30) Foreign Application Priority Data

Feb. 20, 2024 (CN) .......................... 202410194398.0

(51) Int. Cl.
*H05B 45/30* (2020.01)
*F04D 25/06* (2006.01)
*F04D 27/00* (2006.01)
*H02P 23/20* (2016.01)

(52) U.S. Cl.
CPC ............. *H02P 23/20* (2016.02); *F04D 25/06* (2013.01); *F04D 27/001* (2013.01); *F04D 27/004* (2013.01); *H05B 45/30* (2020.01)

(58) Field of Classification Search
CPC ........ H05B 45/10; H05B 45/14; H05B 45/18; H05B 45/20; H05B 45/24; H05B 45/28; H05B 45/37; H02P 23/20; H02P 29/60; H02P 29/68; F04D 25/06; F04D 27/001; F04D 27/004
See application file for complete search history.

(56) References Cited

U.S. PATENT DOCUMENTS 7,652,439 B2 * 1/2010 Tang ..................... F04D 25/088
318/162
2016/0334091 A1 * 11/2016 Kim ........................ F21V 29/61

* cited by examiner

*Primary Examiner* — Long Nguyen
(74) *Attorney, Agent, or Firm* — Westbridge IP LLC (57) ABSTRACT

Disclosed are a fan and lamp control circuit, a fan and lamp device, and a fan and lamp system. The fan and lamp control circuit includes: a voltage conversion circuit configured to convert a voltage output by an AC power supply to obtain a converted voltage and output the converted voltage; an LED drive circuit, configured to drive the LED lamp to work and adjust the brightness and color temperature of the LED lamp according to the received LED control signal; a fan drive circuit, configured to drive the fan to work and adjust the speed of the fan according to the received fan control signal; and a main control circuit, the output end of the main control circuit is electrically connected to the input ends of the LED drive circuit and the fan drive circuit, for sending the LED control signal and the fan control signal.

10 Claims, 9 Drawing Sheets

FAN AND LAMP CONTROL CIRCUIT, FAN AND LAMP DEVICE, AND FAN AND LAMP SYSTEM

CROSS-REFERENCE TO RELATED APPLICATIONS

The present application claims priority to Chinese Patent Application No. 202410194398.0, filed on Feb. 20, 2024, the entire contents of which are incorporated herein by reference.

TECHNICAL FIELD

The present application relates to the technical field of fans, and in particular to a fan and lamp control circuit, a fan and lamp device, and a fan and lamp system.

BACKGROUND

Most of the older generation AC ceiling fan lamps on the market are old and equipped with the original installed wall controller circuit. The lamps and fans have independent control switches. When the old ceiling fans are replaced, existing fans often replaces new lines for the live wire power supply, even needs to pry open the concealed power supply line for replacement, and the wires are exposed during replacement, which poses a greater safety risk. In addition, there are often no high PF drive solutions for fans on the market, resulting in higher power loss. In order to solve the problem of changing the original installation circuit of the original AC ceiling fan lamp product without increasing the user's additional installation costs and changing the user's operating habits, providing a fan and lamp control circuit, a fan and lamp device, and a fan and lamp system has become an urgent problem for those in this technical field to solve.

SUMMARY

The main purpose of the present application is to provide a fan and lamp control circuit, a fan and lamp device and a fan and lamp system, aiming to solve the problem of changing the original installation circuit of the original alternating current (AC) ceiling fan lamp product without increasing the user's additional installation costs and changing the user's operating habits.

In order to achieve the above objectives, the present application provides a fan and lamp control circuit. The control circuit includes:
a voltage conversion circuit, the voltage conversion circuit is connected to an alternating current power supply and configured to convert a voltage output by the AC power supply to obtain a converted voltage and output the converted voltage;
a light-emitting diode (LED) drive circuit, an output end of the voltage conversion circuit is electrically connected to an input end of the LED drive circuit, for driving an LED lamp to work and adjusting brightness and color temperature of the LED lamp according to a received LED control signal;
a fan drive circuit, an output end of the voltage conversion circuit is electrically connected to an input end of the fan drive circuit, for driving the fan to work and adjusting a speed of the fan according to a received fan control signal; and
a main control circuit, an output end of the voltage conversion circuit is electrically connected to an input end of the main control circuit, and an output end of the main control circuit is electrically connected to the input ends of the LED drive circuit and the fan drive circuit, for sending an LED control signal and a fan control signal.

In an embodiment, the voltage conversion circuit includes a first voltage conversion circuit, and the first voltage conversion circuit includes:
a first terminal, the first terminal is electrically connected to the AC power supply and configured to connect the AC power supply with a single live wire; and
a first rectifying and filtering circuit, an input end of the first rectifying and filtering circuit is electrically connected to the first terminal, for converting an alternating current output by the first terminal into a stable direct current.

In an embodiment, the voltage conversion circuit further includes a second voltage conversion circuit, and the second voltage conversion circuit includes:
a second terminal, the second terminal is electrically connected to the AC power supply and configured to connect the AC power supply with dual live wires;
a second rectifying and filtering circuit, an input end of the second rectifying and filtering circuit is electrically connected to the second terminal, for converting an alternating current output by the second terminal into a stable direct current; and
a phase detection circuit, an input end of the phase detection circuit is electrically connected to the second terminal, and an output end of the phase detection circuit is electrically connected to a signal input end of the main control circuit, for identifying and measuring a phase difference of different signals and outputting to the main control circuit.

In an embodiment, the fan and lamp control circuit further includes:
an isolation switch circuit, an input end of the isolation switch circuit is electrically connected to an output end of the first rectifying and filtering circuit and an output end of the second rectifying and filtering circuit, and an output end of the isolation switch circuit is electrically connected to the input end of the LED driver circuit, for isolating a high voltage output by the first rectifying and filtering circuit or the second rectifying and filtering circuit into a safe voltage and outputting to the LED drive circuit; and
a voltage adjustment circuit, an input end of the voltage adjustment circuit is electrically connected to the output end of the first rectifying and filtering circuit and the output end of the second rectifying and filtering circuit, and an output end of the voltage adjustment circuit is electrically connected to the input ends of the main control circuit and the fan drive circuit, for adjusting a voltage output by the first rectifying and filtering circuit or the second rectifying and filtering circuit to a suitable voltage, and outputting to the main control circuit and the fan drive circuit.

In an embodiment, the second rectifying and filtering circuit includes:
an LED rectifying and filtering sub-circuit, an input end of the LED rectifying and filtering sub-circuit is electrically connected to the second terminal, and an output end of the LED rectifying and filtering sub-circuit is electrically connected to the input end of the isolation switch circuit, for rectifying an AC power supply connected to the second terminal and outputting to the isolation switch circuit; and a fan rectifying and filtering sub-circuit, the input end of the LED rectifying and filtering sub-circuit is electrically connected to the second terminal, and the output end of the LED rectifying and filtering sub-circuit is electrically connected to the input end of the isolation switch circuit, for rectifying an AC power supply connected to the second terminal and outputting to the voltage adjustment circuit.

In an embodiment, the phase detection circuit includes:

an LED phase detection sub-circuit, an input end of the LED phase detection sub-circuit is electrically connected to the second terminal, and an output end of the LED phase detection sub-circuit is electrically connected to the signal input end of the main control circuit, for identifying and measuring a phase difference of voltage signals output to the LED driver circuit; and a fan phase detection sub-circuit, an input end of the fan phase detection sub-circuit is electrically connected to the second terminal, and an output end of the fan phase detection sub-circuit is electrically connected to the signal input end of the main control circuit, for identifying and measuring a phase difference of voltage signals output to the fan drive circuit.

In an embodiment, the LED drive circuit includes:

an LED drive sub-circuit, an input end of the LED drive sub-circuit is electrically connected to the output end of the voltage conversion circuit and a signal output end of the main control circuit; and a de-stroboscopic sub-circuit, an output end of the LED drive sub-circuit is electrically connected to the de-stroboscopic sub-circuit, for driving the LED lamp to work and adjusting the brightness and color temperature of the LED lamp according to a received LED control signal, an input end of the de-stroboscopic sub-circuit is electrically connected to the output end of the LED drive sub-circuit, and an output end of the de-stroboscopic sub-circuit is electrically connected to a power supply end of the LED lamp, for smoothing voltage fluctuations output to the LED lamp.

In an embodiment, the fan and lamp control circuit further includes a wireless module, and the wireless module is electrically connected to the main control circuit, for receiving an external control signal and sending working status signals of the fan and the lamp.

In order to achieve the above objectives, the present application also provides a fan and lamp device, which includes:

the fan and lamp control circuit as described above;

a fan body;

a fan motor, provided in the fan body and configured to rotate blades of the fan body;

an LED light, provided in the fan body and configured for lighting; and a temperature sensor, provided on a housing of the fan body and configured to collect an outside temperature.

In order to achieve the above objectives, the present application also provides a fan and lamp system, which includes the fan and lamp device as described above and an external controller for controlling a working state of the fan and lamp device.

The present application provides a fan and lamp control circuit, a fan and lamp device and a fan and lamp system. The voltage conversion circuit is connected to the AC power supply and is configured to convert the voltage output by the AC power supply to obtain a converted voltage and output the converted voltage. The output end of the voltage conversion circuit is electrically connected to the input end of the LED drive circuit, and is configured to drive the LED lamp to work and adjust the brightness and color temperature of the LED lamp according to the received LED control signal. The output end of the voltage conversion circuit is electrically connected to the input end of the fan drive circuit, and is configured to drive the fan to work and adjust the speed of the fan according to the received fan control signal. The output end of the voltage conversion circuit is electrically connected to the input end of the main control circuit, and the output end of the main control circuit is electrically connected to the input ends of the LED drive circuit and the fan drive circuit, for sending the LED control signal and fan control signal. In this way, the present application can convert the voltage output by the AC power supply through the voltage conversion circuit, and then use the converted voltage for the LED drive circuit, the fan drive circuit and the main control circuit. The main control circuit controls the LED drive circuit and the fan drive circuit to drive the LED lamp and the fan to work, thus solving the problem of changing the original installation circuit of the original AC ceiling fan lamp product without increasing the user's additional installation costs and changing the user's operating habits.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

The realization of the purpose, functional characteristics and advantages of the present application will be further described with reference to the accompanying drawings, in combination with embodiments.

DETAILED DESCRIPTION OF THE EMBODIMENTS

The technical solutions of embodiments of the present application will be clearly and completely described below with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all the directional indications in the embodiments of the present application (such as up, down, left, right, front, rear, . . . ) are only used to explain the relative positional relationship, movement, etc. between the components in a specific posture (as shown in the drawings). If the specific posture changes, the directional indications will also change accordingly.

In addition, if there are descriptions involving "first", "second", etc. in the embodiments of the present application, the descriptions of "first", "second", etc. are only for descriptive purposes and shall not be understood as indications or implications of relative importance or implicit indication of the number of technical features indicated. Therefore, features defined as "first" and "second" may explicitly or implicitly include at least one of these features. In addition, the technical solutions in various embodiments can be combined with each other, but it must be based on the realization by those skilled in the art. When the combination of technical solutions is contradictory or cannot be realized, it should be considered that such a combination of technical solutions does not exist, and is not within the scope of the present application.

In an embodiment of the present application, as shown in FIG. 1 to FIG. 8, the present application provides a fan and lamp control circuit. The control circuit includes a voltage conversion circuit 2, a LED drive circuit 6, a fan drive circuit 5 and a main control circuit 1.

The voltage conversion circuit 2 is connected to the AC power supply and is configured to convert the voltage output by the AC power supply to obtain a converted voltage and output the converted voltage.

An output end of the voltage conversion circuit 2 is electrically connected to an input end of the LED drive circuit 6, for driving the LED lamp to work and adjusting the brightness and color temperature of the LED lamp according to the received LED control signal.

The output end of the voltage conversion circuit 2 is electrically connected to an input end of the fan drive circuit 5, for driving the fan to work and adjusting the speed of the fan according to the received fan control signal.

The output end of the voltage conversion circuit 2 is electrically connected to an input end of the main control circuit 1. The output end of the main control circuit 1 is electrically connected to the input ends of the LED drive circuit 6 and the fan drive circuit 5, for sending the LED control signal and fan control signal.

In an embodiment, the voltage conversion circuit 2 can use a linear voltage stabilizing circuit to perform voltage conversion. For example, a low-frequency transformer is used to convert the AC high voltage output by the external live wire into an AC low voltage, and then the full-bridge rectification and half-bridge rectification and other methods are used to rectify the AC low voltage and convert the AC voltage into DC voltage. A LC filter circuit, RC filter circuit, x-type filter circuit or combinations of the above-mentioned multiple filter can be used to filter the DC voltage and supply power to the LED driving circuit 6, the fan driving circuit 5 and the main control circuit 1.

In another embodiment, the voltage conversion circuit 2 can use a switching regulator to perform voltage conversion. For example, the AC voltage output by the external live wire is first converted into a DC voltage through full-bridge rectification, half-bridge rectification, etc., the DC voltage is smoothed through a capacitor, then the smoothed DC voltage is chopped through a switching element, and the chopped DC voltage is stepped down into a square wave through a high-frequency transformer. The square wave DC voltage is rectified by the rectifier diode and smoothed by the capacitor, then the DC voltage is output to supply power to the LED drive circuit 6, the fan drive circuit 5 and the main control circuit 1.

In an embodiment, the main control circuit 1 can be implemented by a main controller, such as a microcontroller unit (MCU), a digital signal processor (DSP), a field programmable gate array (FPGA), and a system on chip (SOC).

In an embodiment, the voltage conversion circuit 2 can convert the voltage output by the AC power supply through the switching regulator or a linear voltage regulator, and then output an appropriate voltage to the LED lamp drive circuit, fan drive circuit 5 and main control circuit 1. The main control circuit 1 sends a control signal to control the operation of the LED lamp drive circuit and the fan driving circuit 5. The LED lamp drive circuit operates according to the control signal.

Figure 2:
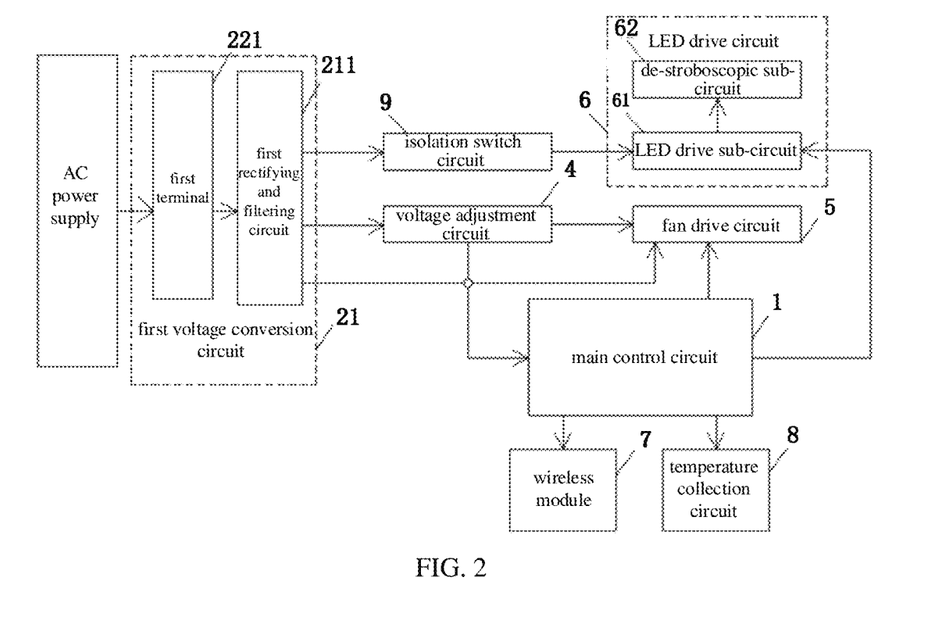
FIG. 2 is a system block diagram of a fan and lamp control circuit according to another embodiment of the present application.
Figure 4:
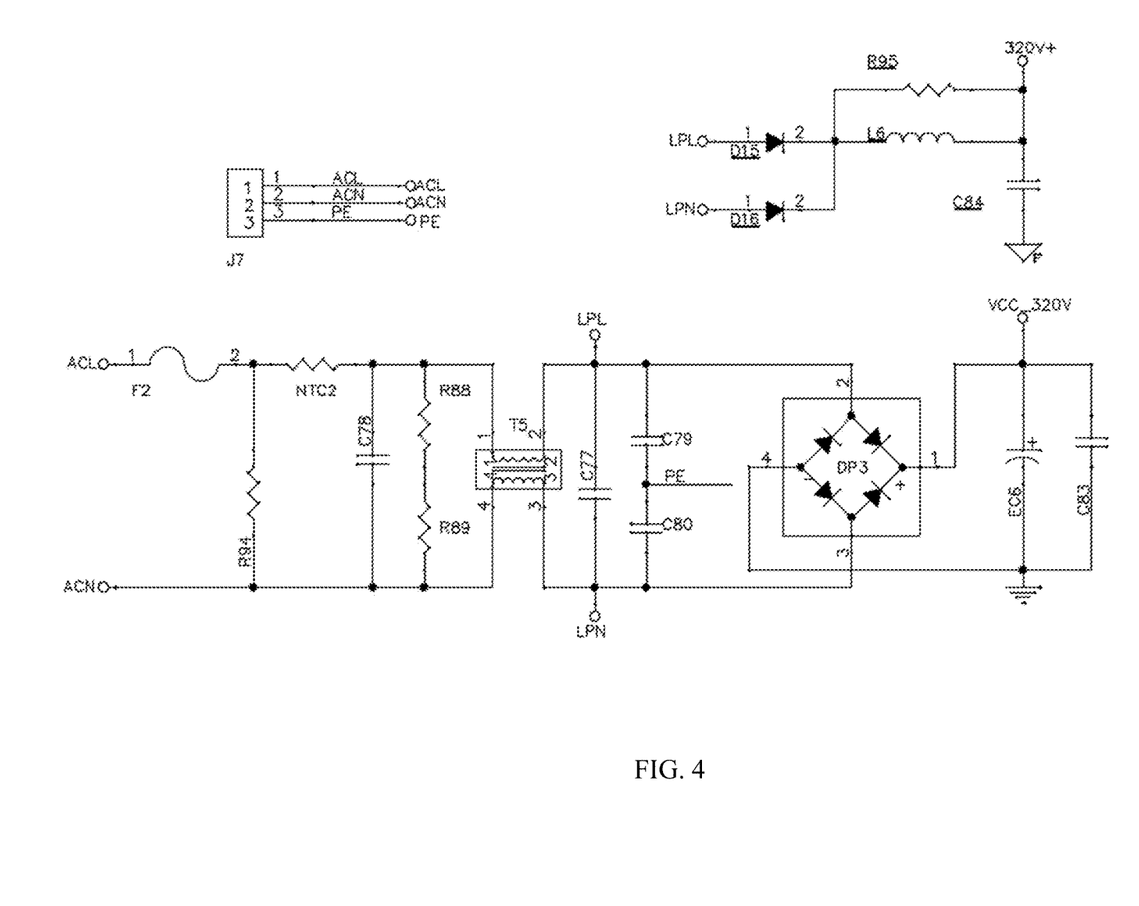
FIG. 4 is a schematic structural diagram of a first rectified filter circuit of the fan and lamp control circuit according to the present application.

In an embodiment, as shown in FIG. 2 and FIG. 4, the voltage conversion circuit 2 includes a first voltage conversion circuit 21, and the first voltage conversion circuit 21 includes a first terminal 221 and a first rectifying and filtering circuit 211.

The first terminal 221 is electrically connected to the AC power supply and is configured to connect the AC power supply with a single live wire.

The first rectifying and filtering circuit 211 has an input end electrically connected to the first terminal 221 and is configured to convert the alternating current output by the first terminal 221 into a stable direct current.

In an embodiment, the first terminal 221 is a three-pin terminal and is provided with an ACL terminal, an ACN terminal and a ground terminal. The first rectifying and filtering circuit 211 includes a first fuse F2, a first thermistor NTC2, a first resistor R94, a second resistor R88, a third resistor R89, a fourth resistor R95, a first capacitor C78, a second capacitor C77, a third capacitor C79, a fourth capacitor C80, a fifth capacitor C83, a sixth capacitor C84, a first diode D15, a second diode D16, a first electrolytic capacitor EC 6, a first inductor L6, a first common mode inductor T5 and a first rectifying bridge DP3. A first end of the first fuse F2 is electrically connected to the first terminal 221J7 through the ACL pin, and a second end of the first fuse F2 is electrically connected to the first end of the first resistor R94 and the first end of the first thermistor NTC2. The second end of the first thermistor NTC2 is electrically connected to the first end of the first capacitor C78, the first end of the second resistor R88 and the first end of the first common mode inductor T5. The second end of the second resistor R88 is electrically connected to the first end of the third resistor R89, and the second end of the first resistor R94, the second end of the first capacitor C78, the second end of the third resistor R89 and the fourth end of the first common mode inductor T5 are electrically connected to the first terminal 221J7 through the ACN pin. The second end of the first common mode inductor T5 is electrically connected to the anode of the first diode D15, the first end of the second capacitor C77, the first end of the third capacitor C79 and the second end of the first rectifying bridge DP3. The second end of the first common mode inductor T5 is electrically connected to the anode of the second diode D16, the second end of the second capacitor C77, the first end of the fourth capacitor C80 and the third end of the first rectifying bridge DP3. The first end of the third capacitor C79 and the second end of the fourth capacitor C80 are grounded, and the fourth end of the first rectifying bridge DP3 is electrically connected to the first end of the first electrolytic capacitor EC6 and the first end of the fourth capacitor C83. The first end of the first rectifying bridge DP3, the second end of the first electrolytic capacitor EC6 and the second end of the fourth capacitor C83 are electrically connected to the motor drive circuit, and the cathode of the first diode and the cathode of the second diode D16 are electrically connected to the first end of the first inductor L6 and the first end of the fourth resistor R95. The second end of the first inductor L6 and the second end of the fourth resistor R95 are electrically connected to the first end of the sixth capacitor C84 and the isolation switch circuit 9, and the second end of the sixth capacitor C84 is grounded. In an embodiment, after the single live wire AC power supply is connected to the first terminal 221, the neutral line and the live wire with the single live wire power supply are filtered by the EMC filter circuit composed of the first fuse F2, the first thermistor NYC2, the first resistor R94, the second resistor R88, the third resistor R89, the first resistor R94, the second resistor R88, the third resistor R89, the fourth resistor R95 and the first common mode inductor T5 through the pin of the first terminal 221. Then, after one voltage is output to the first rectifying bridge DP6 for rectification, it is filtered again by the first electrolytic capacitor EC6 and the fifth capacitor C83 and is output to the fan drive circuit 5. The other voltage is output to the first diode D15 and the second diode D16, is rectified by the first diode D15 and the second diode D16, and is filtered by the fourth resistor R95, the first inductor L6 and the fourth resistor R95, then it is output to the isolation switch circuit 9. Thus, the primary voltage conversion of the power supply to the fan drive circuit 5 and the power supply to the LED drive circuit 6 are completed. Therefore, after the first terminal 221 is connected to the AC power supply of the external single live wire, the fan and lamp control circuit can use the voltage with the single live wire AC power supply.

Figure 3:
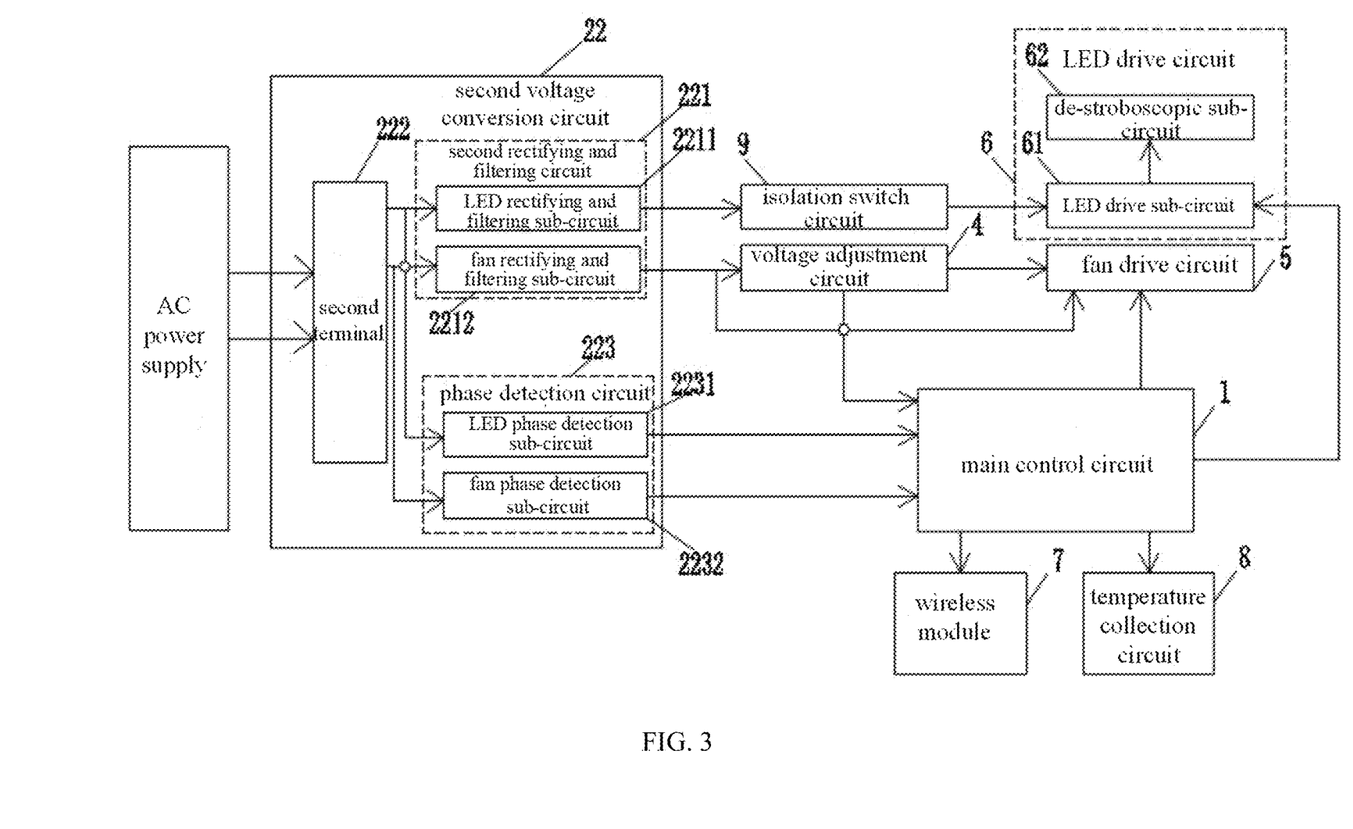
FIG. 3 is a system block diagram of a fan and lamp control circuit according to a further embodiment of the present application.

In an embodiment, as shown in FIG. 3, the voltage conversion circuit 2 also includes a second voltage conversion circuit 22, and the second voltage conversion circuit 22 includes a second terminal 222, a second rectifying and filtering circuit 221 and a phase detection circuit 223.

The second terminal 222 is electrically connected to the AC power supply and is configured to connect the AC power supply with the dual live wires.

The input end of the first rectifying and filtering circuit 211 is electrically connected to the first terminal 221, and is configured to convert the alternating current output by the second terminal 222 into a stable direct current.

The input end of the phase detection circuit 223 is electrically connected to the second terminal 222. The output end of the phase detection circuit 223 is electrically connected to the signal input end of the main control circuit 1, for identifying and measuring the phase differences of different signals and then output them to the main control circuit 1.

In an embodiment, when the second terminal 222 is connected to an external dual live wire power supply, the primary voltage for supplying power to the fan drive circuit 5 and the LED drive circuit 6 are output after rectifying and filtering by the second rectifying and filtering circuit 221, and the phase difference of the fan and LED signals is identified and measured through the phase detection circuit 223 and output to the main control circuit 1, thereby realizing the precise control function of the main control circuit 1. In an embodiment, the second terminal 222 is provided with four pin terminals including a live wire terminal for LED operation, a live wire terminal for fan operation, a neutral terminal and a ground terminal.

Figure 1:
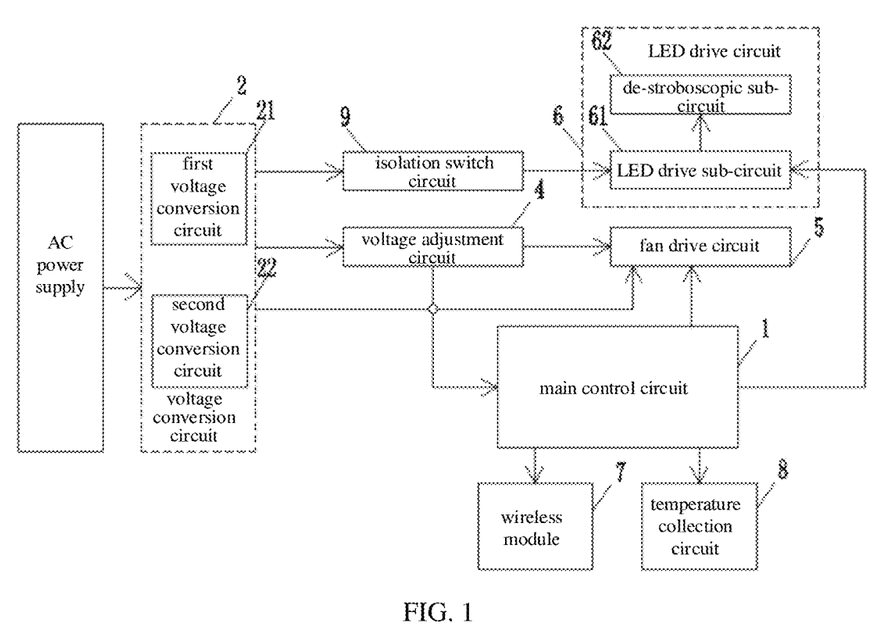
FIG. 1 is a system block diagram of a fan and lamp control circuit according to an embodiment of the present application.

In another embodiment, as shown in FIG. 1, the fan and lamp control circuit can be provided with a four-pin terminal, and the first voltage conversion circuit 21 and the second voltage conversion circuit 22 can be provided on the same circuit board. By providing a simple detection circuit and detecting whether three or four pins are connected to the terminal, the AC power supply is identified as the single live wire input or dual live wire input. A shift switch is provided between the terminal with four pins and the line that the first voltage conversion circuit 21 and the second voltage conversion circuit 22 are connected, so that the first voltage conversion circuit 21 or the second voltage conversion circuit 22 can be switched to be used for the fan and lamp control circuit.

In yet another embodiment, in the fan and lamp control circuit, the first terminal 221, the second terminal 222, the first voltage conversion circuit 21 and the second voltage conversion circuit 22 can be provided on the same circuit board, so that when the AC power supply with a single live wire is connected to the first terminal, the first voltage conversion circuit 21 can use the AC power supply of dual live wires to operate the fan and lamp control circuit. Alternatively, when the AC power supply of dual live wires is connected to the first terminal, the second voltage conversion circuit 22 can use the AC power supply of dual live wires to operate the fan and lamp control circuit.

In an embodiment, as shown in FIGS. 1, 2, 3, 5 and 6, the fan and lamp control circuit also includes an isolation switch circuit 9 and a voltage adjustment circuit 4.

The input end of the isolation switch circuit 9 is electrically connected to the output end of the first rectifying and filtering circuit 211 and the output end of the second rectifying and filtering circuit 221, and the output end of the isolation switch circuit 9 is electrically connected to the input end of the LED drive circuit 6, for isolating the high voltage output by the first rectifying and filtering circuit 211 or the second rectifying and filtering circuit 221 into a safe voltage and then outputting to the LED drive circuit 6.

The input end of the voltage adjustment circuit 4 is electrically connected to the output end of the first rectifying and filtering circuit 211 and the output end of the second rectifying and filtering circuit 221, and the output end of the voltage adjustment circuit 4 is electrically connected to the input ends of the main control circuit 1 and the fan drive circuit 5, for adjusting the voltage output by the first rectifying and filtering circuit 211 or the second rectifying and filtering circuit 221 to a suitable voltage and then outputting to the main control circuit 1 and the fan drive circuit 5.

Figure 5:
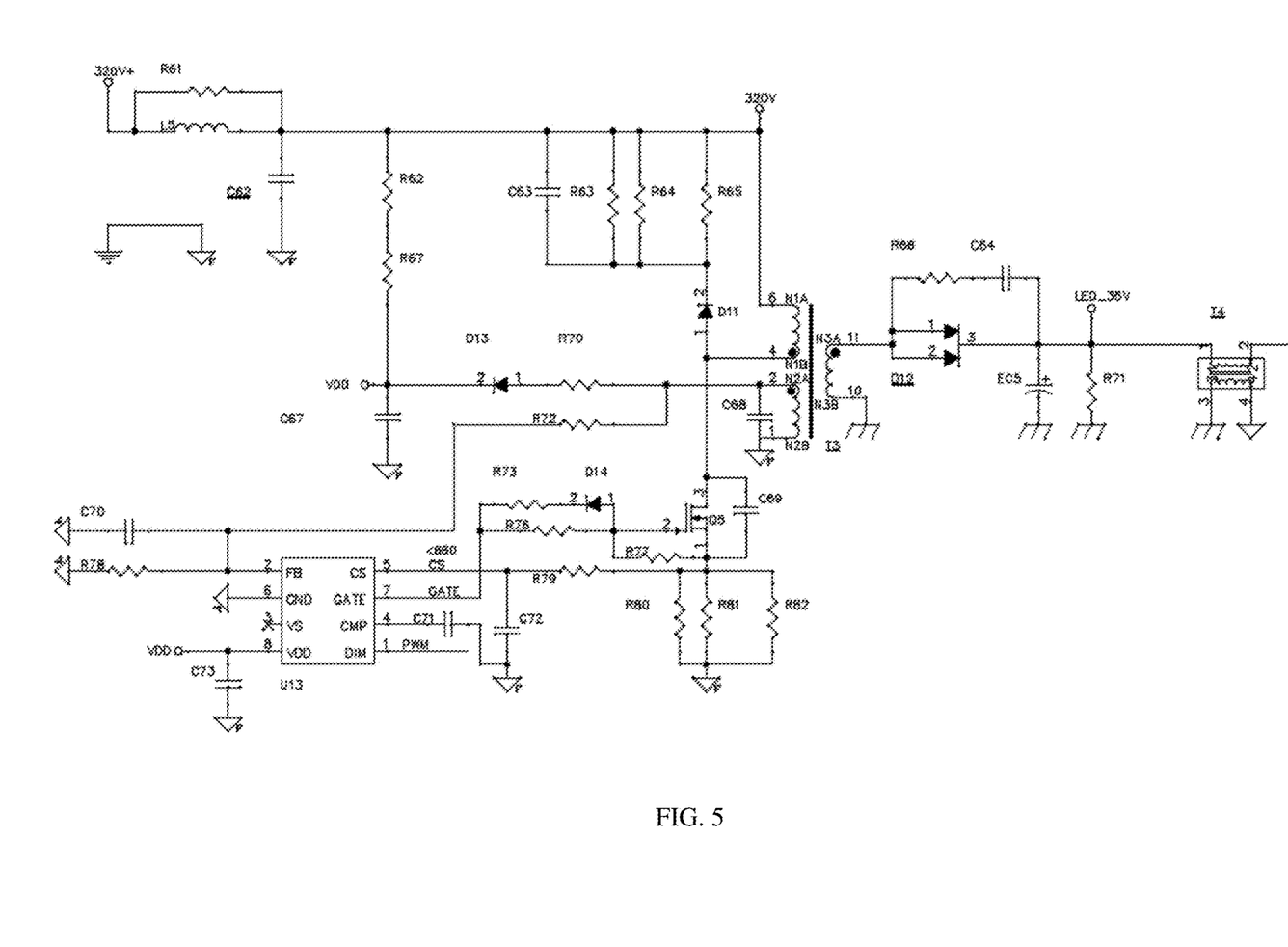
FIG. 5 is a schematic structural diagram of an isolating switch circuit of the fan and lamp control circuit according to the present application.

In an embodiment, as shown in FIG. 5, the isolation switch circuit 9 includes a first power management chip U13, a first transformer T3, a first Schottky diode D12, a second common mode inductor T4 and a second electrolytic capacitor EC5. After the first rectifying and filtering circuit 211 or the second rectifying and filtering circuit 221 outputs the primary voltage, the voltage used for the LED drive circuit 6 is rectified through the first transformer T3, the Schottky diode D12 and the peripheral circuit of the isolation switch circuit 9, and then filtered by the second electrolytic capacitor EC5 and the second common mode inductor T4, a voltage power supply with a high PF value is obtained for the LED drive circuit 6.

Figure 6:
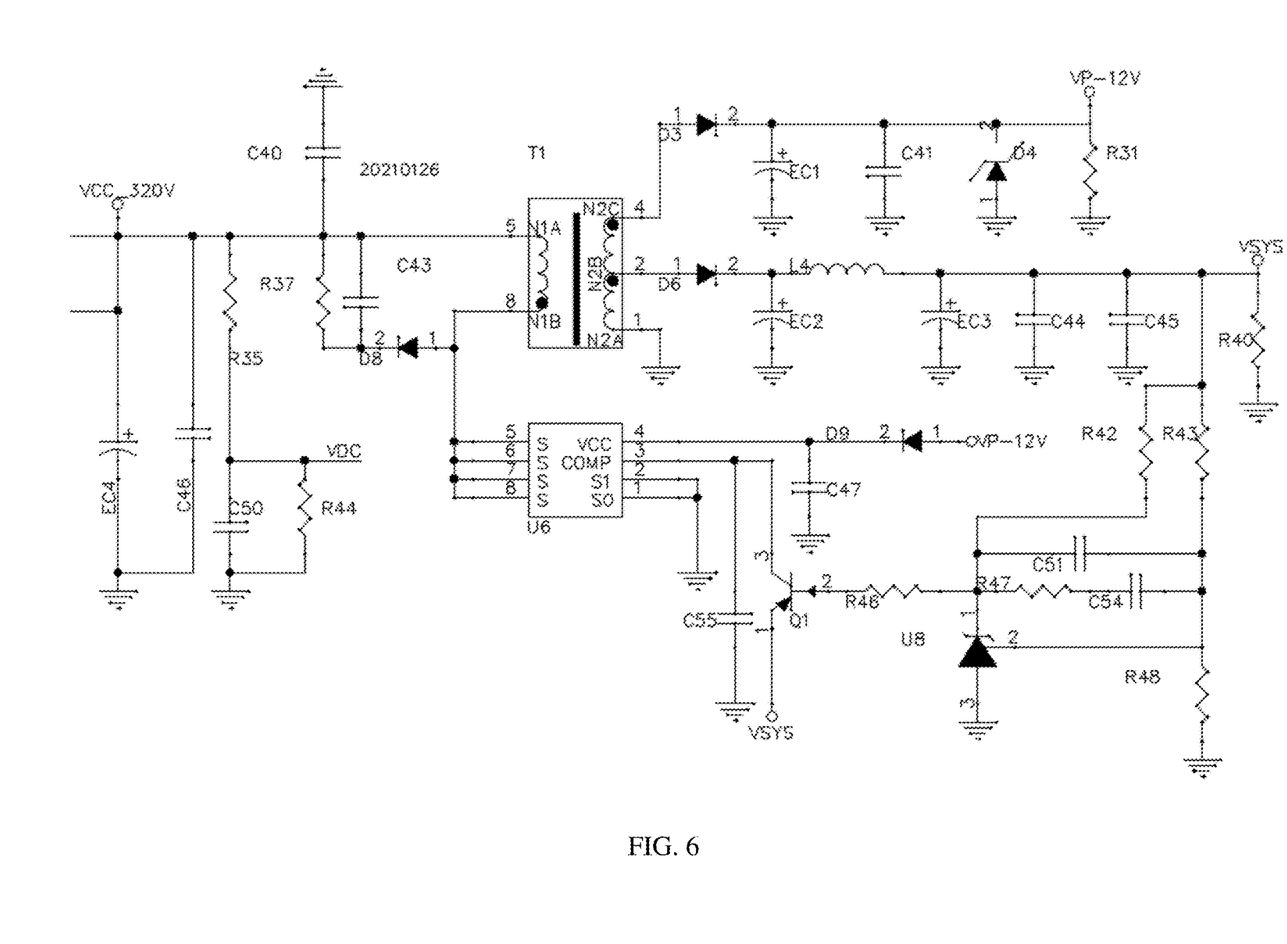
FIG. 6 is a schematic structural diagram of a voltage adjustment circuit of the fan and lamp control circuit according to the present application.

In an embodiment, as shown in FIG. 6, the voltage adjustment circuit 4 includes a second transformer T1, a second power management chip U6, a third diode D3 and a fourth diode D6. The voltage adjustment circuit 4 forms a feedback automatic voltage reduction circuit through the second transformer T1, the second power management chip U6 and the peripheral circuit of the voltage adjustment circuit 4. One secondary winding of the second transformer T1 is stabilized and filtered through the four diode D6 and the peripheral circuit of the voltage adjustment circuit 4, and then the VSYS power supply is output for the fan and lamp control circuit. The other secondary winding of the second transformer T1 is stabilized and filtered through the three diode D3 and the peripheral circuit of the voltage adjustment circuit 4, and then the VP-12V power supply is output for the fan and lamp control circuit.

Figure 7:
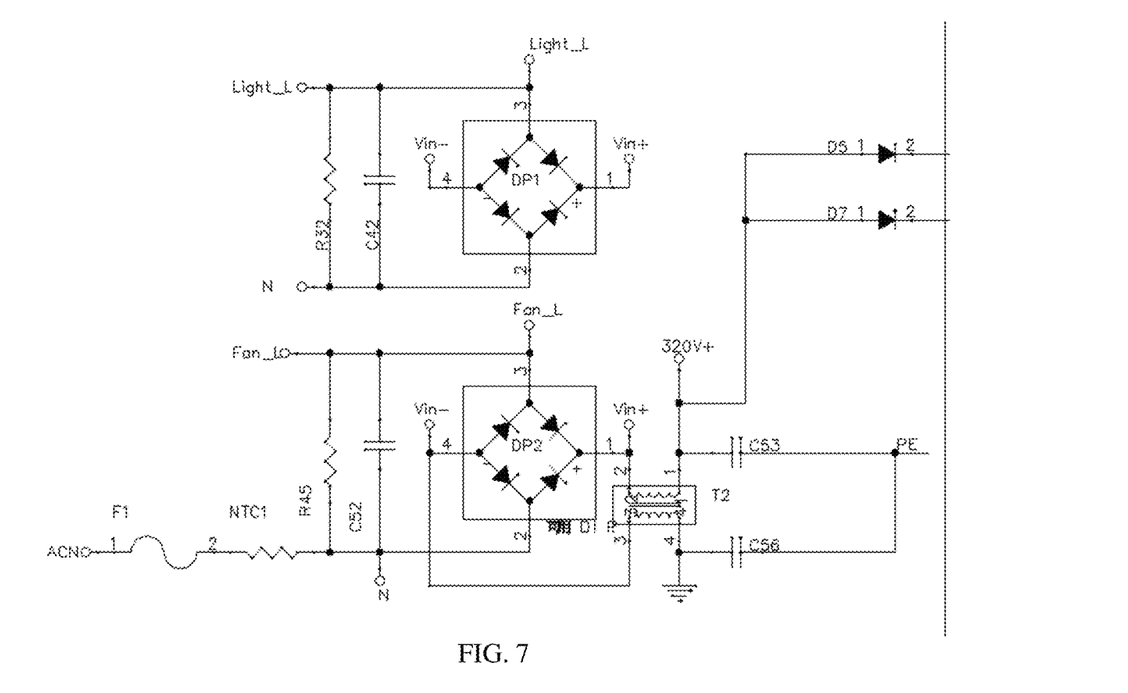
FIG. 7 is a schematic structural diagram of the LED rectified filter sub-circuit and the fan rectified filter sub-circuit of the fan and lamp control circuit according to the present application.

In an embodiment, as shown in FIG. 7, the second rectifying and filtering circuit 221 includes an LED rectifying and filtering sub-circuit 2211 and a fan rectifying and filtering sub-circuit 2212.

The input end of the LED rectifying and filtering sub-circuit 2211 is electrically connected to the second terminal 222, and the output end of the LED rectifying and filtering sub-circuit 2211 is electrically connected to the input end of the isolation switch circuit 9, for rectifying the AC power supply connected to the second terminal 222 and outputting it to the isolation switch circuit 9.

The input end of the LED rectifying and filtering sub-circuit 2211 is electrically connected to the second terminal 222, and the output end of the LED rectifying and filtering sub-circuit 2211 is electrically connected to the input end of the isolation switch circuit 9, for rectifying the AC power supply connected to the second terminal 222 and then outputting to the voltage adjustment circuit 4.

In an embodiment, the fan rectifying and filtering sub-circuit 2212 includes a second rectifying bridge DP2, a third common mode inductor T2, a second fuse F1, a second thermistor NTC1, a fifth resistor R45, a fourth diode D5, a fifth diode D7, a seventh capacitor C52, an eighth capacitor C53 and a ninth capacitor C56. The ACN end of the second terminal 222 is electrically connected to the first end of the second fuse F1, and the second end of the second fuse F1 is electrically connected to the first end of the second thermistor NTC1. The second end of the second thermistor NTC1 is electrically connected to the first end of the fifth resistor R45, the first end of the seventh capacitor C52 and the second end of the second rectifying bridge DP2, and the second end of the fifth resistor R45, the second end of the seventh capacitor C52 and the third end of the second rectifying bridge DP2 are electrically connected to the live wire end of the second terminal 222 for fan operation. The fourth end of the second rectifying bridge DP2 is electrically connected to the third end of the third common mode inductor T2, and the first end of the second rectifying bridge DP2 is electrically connected to the second end of the third common mode inductor T2. The fourth terminal of the third common mode inductor T2 and the first end of the ninth capacitor C56 are grounded, and the second end of the ninth capacitor C56 and the first end of the eighth capacitor C53 are grounded. The second end of the eighth capacitor C53 is electrically connected to the isolation switch circuit 9, the anode of the fourth diode D5 and the anode of the fifth diode D7. The cathode of the fourth diode D5 and the cathode of the fifth diode D7 are electrically connected to the voltage adjustment circuit 4. In an embodiment, the second rectifying bridge DP2, the third common mode inductor T2, the second fuse F1, the second thermistor NTC1, the fifth resistor R45, the seventh capacitor C52, the eighth capacitor C53 and the ninth capacitor C56 form an EMC filtering circuit to filter the voltage at the live wire end for operation of LED connected to the second terminal 222. Then, one voltage is directly output to supply power to the isolation switch circuit 9, and the other voltage is rectified by the fourth diode D5 and the fifth diode D7 to supply power to the voltage adjustment circuit 4. The ACN pin of the second terminal 222 with the dual live wires is shared by the fan rectifying and filtering sub-circuit 2212 and the LED rectifying and filtering sub-circuit 2211.

In an embodiment, the LED rectifying and filtering sub-circuit 2211 includes a third rectifying bridge DP1, a third common mode inductor T2, a second fuse F1, a second thermistor NTC1, a sixth resistor R32, a fourth diode D5, a fifth diode D7, an eighth capacitor C53, a ninth capacitor C56 and a tenth capacitor C42. The neutral line of the second terminal 222 is electrically connected to the first end of the second fuse F1, and the second end of the second fuse F1 is electrically connected to the first end of the second thermistor NTC1. The second end of the second thermistor NTC1 is electrically connected to the first end of the sixth resistor R32, the first end of the tenth capacitor C42 and the second end of the first rectifying bridge DP1, and the second end of the sixth resistor R32, the second end of the tenth capacitor C42 and the third end of the three rectifying bridge DP1 are electrically connected to the live wire end of the second terminal 222 for LED operation. The fourth end of the third rectifying bridge DP1 is electrically connected to the third end of the third common mode inductor T2, and the first end of the third rectifying bridge DP1 is electrically connected to the second end of the third common mode inductor T2. The fourth end of the third common mode inductor T2 and first end of the ninth capacitor C56 are grounded, and the second end of the ninth capacitor C56 and the first end of the eighth capacitor C53 are grounded. The second end of the eighth capacitor C53 is electrically connected to the isolation switch circuit 9, the anode of the fourth diode D5 and the anode of the fifth diode D7. The cathode of the fourth diode D5 and the cathode of the fifth diode D7 are electrically connected to the voltage adjustment circuit 4. In an embodiment, the third rectifying bridge DP1, the third common mode inductor T2, the second fuse F1, the second thermistor NTC1, the sixth resistor R32, the eighth capacitor C53, the ninth capacitor C56 and the tenth capacitor C32 form an EMC filtering circuit to filter the voltage at the live wire terminal connected to the second terminal 222 for LED operation. Then, one voltage is directly output to supply power to the isolation switch circuit 9, and the other voltage is rectified by the fourth diode D5 and the fifth diode D7 to supply power to the voltage adjustment circuit 4. The DC voltage output of the LED rectifying and filtering sub-circuit 2211 and the fan rectifying and filtering sub-circuit 2212 is a combined output.

Figure 8:
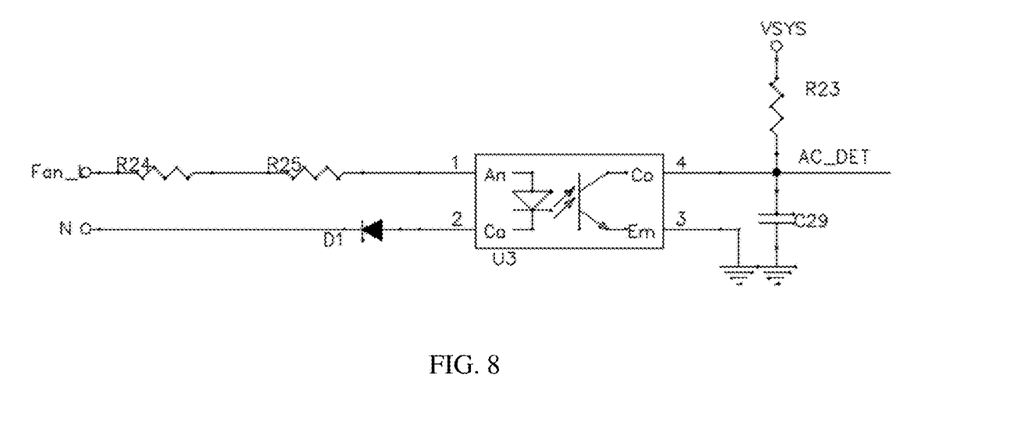
FIG. 8 is a schematic structural diagram of a phase detection circuit of the fan and lamp control circuit according to the present application.

In an embodiment, as shown in FIG. 8, the phase detection circuit 223 includes an LED phase detection sub-circuit 2231 and a fan phase detection sub-circuit 2232.

The input end of the LED phase detection sub-circuit 2231 is electrically connected to the second terminal 222, and the output end of the LED phase detection sub-circuit 2231 is electrically connected to the signal input end of the main control circuit 1, for identifying and measuring the phase difference of the voltage signal output to the LED drive circuit 6.

The input end of the fan phase detection sub-circuit 2232 is electrically connected to the second terminal 222, and the output end of the fan phase detection sub-circuit 2232 is electrically connected to the signal input end of the main control circuit 1, for identifying and measuring the phase difference of the voltage signal output to the fan drive circuit 5.

In an embodiment, the LED phase detection sub-circuit 2231 includes a seventh resistor R24, an eighth resistor R24, a ninth resistor R23, an eleventh capacitor C29, a fifth diode D1 and a first photoelectric isolator U3. The LIGHT end of the second terminal 222 is electrically connected to the first end of the seventh resistor R24, and the second end of the seventh resistor R24 is electrically connected to the first end of the first photoelectric isolator U3. The fourth end of the first photoelectric isolator U3 is electrically connected to the voltage adjustment circuit 4, the main control circuit 1 and the first end of the eleventh capacitor C29, and the third end of the first photoelectric isolator U3 is grounded. The fourth end of the first photoelectric isolator U3 is electrically connected to the anode of the fifth diode D1, the cathode of the fifth diode D1 is grounded, and the second end of the eleventh capacitor C29 is grounded. The LED phase detection sub-circuit 2231 detects the phase difference signal through the first photoelectric isolator U3, and then sends it to the main control circuit 1 for identification, thereby achieving precise control of the LED lamp by the main control circuit 1.

In an embodiment, the fan phase detection sub-circuit 2232 detects the phase difference signal through another photoelectric isolator and then sends it to the main control circuit 1 for identification, thereby achieving precise control of the fan by the main control circuit 1. The circuit structure of the fan phase detection sub-circuit 2232 is similar to the structure of the LED phase detection sub-circuit 2231, so the details will not be described.

In an embodiment, the LED drive circuit 6 includes an LED drive sub-circuit 61 and a de-stroboscopic sub-circuit 62.

The input end of the LED drive sub-circuit 61 is electrically connected to the output end of the voltage conversion circuit and the signal output end of the main control circuit 1, and the output end of the LED drive sub-circuit 61 is electrically connected to the de-stroboscopic sub-circuit 62, for driving the LED lamp to work and adjusting the brightness and color temperature of the LED lamp according to the received LED control signal.

The input end of the de-stroboscopic sub-circuit 62 is electrically connected to the output end of the LED drive sub-circuit 61, and the output end of the de-stroboscopic sub-circuit 62 is electrically connected to the power supply end of the LED, for smoothing the voltage fluctuations output to the LED.

In an embodiment, the de-stroboscopic sub-circuit 62 can use a capacitive filtering method, a voltage regulation and stabilization method, or a combination thereof to smooth the voltage fluctuations output to the LED.

In an embodiment, the fan and lamp control circuit also includes a wireless module 7, which is electrically connected to the main control circuit 1 and is used to receive external control signals and send working status signals of the fan and lamp.

In an embodiment, the wireless module 7 can be a 4G module, a 5G module, a Bluetooth module, an infrared module, an Internet of Things module, and other modules, thereby having the functions of remote control and receiving or sending data.

In an embodiment, the fan and lamp control circuit also includes a temperature collection circuit, which is electrically connected to the main control circuit 1 and is used to collect external temperature signals.

Figure 9:
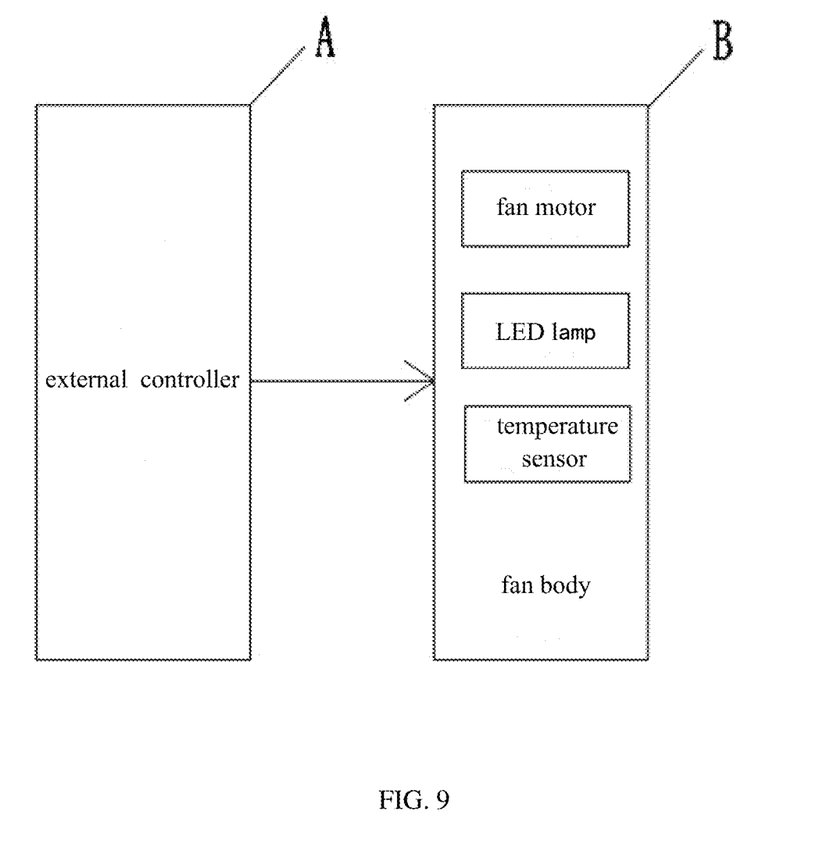
FIG. 9 is a system block diagram of a fan and lamp device and a fan and lamp system according to the present application.

Please refer to FIG. 9, the present application also provides a fan and lamp device, which includes the fan and lamp control circuit as described above. The fan and lamp device also includes a fan body, a fan motor, an LED lamp and a temperature sensor.

The fan motor is provided in the fan body and is configured to rotate blades of the fan body.

The LED lamp is provided in the fan body and is configured for lighting.

The temperature sensor is provided on the housing of the fan body and is configured to collect the outside temperature.

In an embodiment, the fan body can be in the shape of a bladeless fan, a ceiling fan, a tower fan, a wall fan, etc., the fan motor can be a brush motor or a brushless motor, the LED lamp can be a plug-in, SMD and high-power LED lamps, and the temperature sensor can be a thermocouple, a thermistor, a resistance temperature detector, an IC temperature sensor, etc.

Referring to FIG. 9, the present application also provides a fan and lamp system, which includes the fan and lamp device as described above and an external controller for controlling the working status of the fan and lamp device.

In an embodiment, the external controller can use APP control, remote control, switch button control and other control methods to control the working state of the fan.

The present application provides a fan and lamp control circuit, a fan and lamp device and a fan and lamp system. The voltage conversion circuit is connected to the AC power supply and is used to convert and output the voltage output by the AC power supply. The output end of the voltage conversion circuit is electrically connected to the input end of the LED drive circuit, and is used to drive the LED lamp to work and adjust the brightness and color temperature of the LED lamp according to the received LED control signal. The output end of the voltage conversion circuit is electrically connected to the input end of the fan drive circuit, and is used to drive the fan to work and adjust the speed of the fan according to the received fan control signal. The output end of the voltage conversion circuit is electrically connected to the input end of the main control circuit, and the output end of the main control circuit is electrically connected to the input ends of the LED drive circuit and the fan drive circuit, used to emit the LED control signal and fan control signal. In this way, the present application can convert the voltage output by the AC power supply through the voltage conversion circuit, and then use the converted voltage for the LED drive circuit, the fan drive circuit and the main control circuit. The main control circuit controls the LED drive circuit and the fan drive circuit to drive the LED lamp and fan to work, thus solving the problem of changing the original installation circuit of the original AC ceiling fan lamp product without increasing the user's additional installation costs and changing the user's operating habits.

It should be noted that in this document, the terms "include", "comprise" or any other variants thereof are intended to cover a non-exclusive inclusion. Thus, a process, method, article or device that includes a series of elements not only includes those elements, but also includes other elements that are not expressly listed, or also includes elements inherent to the process, method, article or device. If there are no more restrictions, the element defined by the sentence "including a . . . " does not exclude the existence of other identical elements in the process, method, article or device that includes the element.

The above serial numbers of the embodiments of the present application are only for description and do not represent the advantages and disadvantages of the embodiments.

The above are only some embodiments of the present application, and are not intended to limit the patent scope of the present application. Any equivalent structure or equivalent process transformation made using the contents of the description and drawings of the present application, or directly or indirectly applied in other related technical fields, are equally included in the scope of the present application.

What is claimed is:

1. A fan and lamp control circuit, comprising:
   a voltage conversion circuit, wherein the voltage conversion circuit is connected to an alternating current (AC) power supply and configured to convert a voltage output by the AC power supply to obtain a converted voltage and output the converted voltage;
   a light-emitting diode (LED) drive circuit, wherein an output end of the voltage conversion circuit is electrically connected to an input end of the LED drive circuit;
   a fan drive circuit, wherein the output end of the voltage conversion circuit is electrically connected to an input end of the fan drive circuit; and
   a main control circuit, wherein the output end of the voltage conversion circuit is electrically connected to a power input end of the main control circuit, and a power output end of the main control circuit is electrically connected to the input ends of the LED drive circuit and the fan drive circuit,
   wherein the main control circuit is configured to send an LED control signal and a fan control signal, the LED drive circuit is configured to receive the LED control signal and drive an LED lamp to work and adjust brightness and color temperature of the LED lamp according to the LED control signal, and the fan drive circuit is configured to receive the fan control signal, and drive a fan to work and adjust a speed of the fan according to the fan control signal.

2. The fan and lamp control circuit of claim 1, wherein the voltage conversion circuit comprises a first voltage conversion circuit, and the first voltage conversion circuit comprises:
   a first terminal, wherein the first terminal is electrically connected to the AC power supply and configured to connect the AC power supply with a single live wire; and
   a first rectifying and filtering circuit, wherein an input end of the first rectifying and filtering circuit is electrically connected to the first terminal, for converting an alternating output by the first terminal into a stable direct voltage.

3. The fan and lamp control circuit of claim 2, wherein the voltage conversion circuit further comprises a second voltage conversion circuit, and the second voltage conversion circuit comprises:
   a second terminal, wherein the second terminal is electrically connected to the AC power supply and configured to connect the AC power supply with dual live wires;
   a second rectifying and filtering circuit, wherein an input end of the second rectifying and filtering circuit is electrically connected to the second terminal, for converting an alternating voltage corresponding to the AC power supply output by the second terminal into a stable direct voltage; and
   a phase detection circuit, wherein an input end of the phase detection circuit is electrically connected to the second terminal, and an output end of the phase detection circuit is electrically connected to a signal input end of the main control circuit, for identifying and measuring a phase difference of different signals and outputting to the main control circuit.

4. The fan and lamp control circuit of claim 3, further comprising:
   an isolation switch circuit, wherein an input end of the isolation switch circuit is electrically connected to an output end of the first rectifying and filtering circuit and an output end of the second rectifying and filtering circuit, and an output end of the isolation switch circuit is electrically connected to the input end of the LED driver circuit, for isolating a high voltage output by the first rectifying and filtering circuit or the second rectifying and filtering circuit into a safe voltage and outputting to the LED drive circuit; and
   a voltage adjustment circuit, wherein an input end of the voltage adjustment circuit is electrically connected to the output end of the first rectifying and filtering circuit and the output end of the second rectifying and filtering circuit, and an output end of the voltage adjustment circuit is electrically connected to the input ends of the main control circuit and the fan drive circuit, for adjusting a voltage output by the first rectifying and filtering circuit or the second rectifying and filtering circuit to a suitable voltage, and outputting to the main control circuit and the fan drive circuit.

5. The fan and lamp control circuit of claim 4, wherein the second rectifying and filtering circuit comprises:
   an LED rectifying and filtering sub-circuit, wherein an input end of the LED rectifying and filtering sub-circuit is electrically connected to the second terminal, and an output end of the LED rectifying and filtering sub-circuit is electrically connected to the input end of the isolation switch circuit, for rectifying the AC power supply connected to the second terminal and outputting to the isolation switch circuit; and
   a fan rectifying and filtering sub-circuit, wherein the input end of the LED rectifying and filtering sub-circuit is electrically connected to the second terminal, and the output end of the LED rectifying and filtering sub-circuit is electrically connected to the input end of the isolation switch circuit, for rectifying the AC power supply connected to the second terminal and outputting to the voltage adjustment circuit.

6. The fan and lamp control circuit of claim 3, wherein the phase detection circuit comprises:
   an LED phase detection sub-circuit, wherein an input end of the LED phase detection sub-circuit is electrically connected to the second terminal, and an output end of the LED phase detection sub-circuit is electrically connected to the signal input end of the main control circuit, for identifying and measuring a phase difference of voltage signals output to the LED driver circuit; and a fan phase detection sub-circuit, wherein an input end of the fan phase detection sub-circuit is electrically connected to the second terminal, and an output end of the fan phase detection sub-circuit is electrically connected to the signal input end of the main control circuit, for identifying and measuring a phase difference of voltage signals output to the fan drive circuit.

7. The fan and lamp control circuit of claim 1, wherein the LED drive circuit comprises:

an LED drive sub-circuit, wherein an input end of the LED drive sub-circuit is electrically connected to the output end of the voltage conversion circuit and a signal output end of the main control circuit; and a de-stroboscopic sub-circuit, wherein an output end of the LED drive sub-circuit is electrically connected to the de-stroboscopic sub-circuit, for driving the LED lamp to work and adjusting the brightness and color temperature of the LED lamp according to the LED control signal, an input end of the de-stroboscopic sub-circuit is electrically connected to the output end of the LED drive sub-circuit, and an output end of the de-stroboscopic sub-circuit is electrically connected to a power supply end of the LED lamp, for smoothing voltage fluctuations output to the LED lamp.

8. The fan and lamp control circuit of claim 1, further comprising:

a wireless module, wherein the wireless module is electrically connected to the main control circuit, for receiving an external control signal and sending working status signals of the fan and the lamp.

9. A fan and lamp device, comprising:
a fan and lamp control circuit;
a fan comprising a fan body and a fan motor, wherein the fan motor is, provided in the fan body and configured to rotate blades of the fan body;
an LED lamp, provided in the fan body and configured for lighting; and
a temperature sensor, provided on a housing of the fan body and configured to collect an outside temperature;
wherein the fan and lamp control circuit comprises:
a voltage conversion circuit, wherein the voltage conversion circuit is connected to an AC power supply and configured to convert a voltage output by the AC power supply to obtain a converted voltage and output the converted voltage;
a LED drive circuit, wherein an output end of the voltage conversion circuit is electrically connected to an input end of the LED drive circuit;
a fan drive circuit, wherein the output end of the voltage conversion circuit is electrically connected to an input end of the fan drive circuit; and
a main control circuit, wherein the output end of the voltage conversion circuit is electrically connected to a power input end of the main control circuit, and a power output end of the main control circuit is electrically connected to the input ends of the LED drive circuit and the fan drive circuit,
wherein the main control circuit is configured to send an LED control signal and a fan control signal, the LED drive circuit is configured to receive the LED control signal and drive the LED lamp to work and adjust brightness and color temperature of the LED lamp according to the LED control signal, and the fan drive circuit is configured to receive the fan control signal, and drive the fan to work and adjust a speed of the fan according to the fan control signal.

10. A fan and lamp system, comprising the fan and lamp device of claim 9 and an external controller for controlling a working state of the fan and lamp device.

* * * * *